UNITED STATES PATENT OFFICE 2,145,369

SUBSTITUTED ARYL SULPHONIC ACIDS AND PROCESSES OF MAKING THE SAME

Arthur L. Osterhof, Newark, Del., assignor to Hercules Powder Company, Wilmington, Del., a corporation of Delaware No Drawing. Application June 17, 1938, Serial No. 214,386

12 Claims. (Cl. 260—512)

This invention relates to substituted aryl sulphonic acids, and more particularly to condensation products of terpenes and aryl sulphonic acids and processes of making the same.

I have found that aromatic compounds substituted in the nucleus by a terpene radical and terpene phenol ethers, may be obtained by condensing aromatic hydrocarbons or derivatives thereof with terpenes or with their oxygenated derivatives, using a suitable acid condensing agent. I have also found that such condensation products may be converted into sulphonic acid derivatives by treatment with the ordinary sulphonating agents, or the process may also be carried out in a single stage by reacting a sulphonic acid derivative of an aromatic hydrocarbon with a terpene in the presence of a suitable acid condensing agent.

The process according to the present invention is particularly applicable to aromatic compounds which are capable of sulphonation, for example, aromatic hydrocarbons of the benzene and naphthalene series and their homologues, and more particularly, non-halogenated aromatic hydrocarbons and their hydroxyl compounds, such as phenols; cresols, as p-cresol, m-cresol and o-cresol; naphthols, and the like.

The condensation may be carried out with terpenes, e. g., pinene, turpentine, terpinene, terpinolene, dipentene, or with crude materials rich in such substances.

The products obtained in accordance with the present invention in the form of free acids or their alkali salts are clearly soluble in water and exhibit remarkable wetting, emulsifying and dispersing properties. They can be employed wherever a wetting, cleansing or emulsifying action is required, as, for example, in the treatment of textile fibers, in the de-inking of paper stock and in washing spray residues from fruit. They are particularly useful in acid solutions, for example, in the carbonizing bath or as spreading agents for dilute sulphuric acid used for weed control. They are also applicable in the preparation of dispersions of liquids or solids insoluble in water, for example, dispersions of petroleum oils, fatty oils, and waxes. Mixtures of sulphonic acids, or their salts, with soaps, sulphonated oils, or other soap-like materials, may also be employed with advantage, for example, in dyebaths.

The invention will be described in greater detail in the following specific examples, which illustrate typical modifications, but the invention is not limited to these examples.

Example I

To 272 parts by weight of alpha-pinene in a flask were added 188 parts by weight of phenol, the mixture warmed until solution occurred, then 4.5 parts by weight of p-toluenesulphonic acid added. The flask was equipped with a reflux condenser and placed in an oil bath heated to 100° C. The temperature of the mixture rose to 120° C. The flask was removed from the oil bath, allowed to cool to 100° C., then again placed in the oil bath and heated to about 120° C. The temperature of the mixture rose rapidly, to about 160–170° C., even after the flask was removed from the oil bath and placed in cold water. The product, after cooling, was diluted with 250 parts by volume of benzene, washed thoroughly with water and dried by filtering through kieselguhr, and the solvent removed by distillation in vacuo at about 180° C.

Then 115 parts by weight of the above product, dissolved in an equal weight of carbon tetrachloride was sulphonated by adding about 64 parts by weight of chlorosulphonic acid at 20–25° C. and maintaining the mixture at such temperature for ½ hour, then pouring into 220 parts by weight of water containing 10% caustic soda.

Example II

To 50 parts by weight of phenol were added 100 parts by weight of dipentene, 40 parts by weight of alcohol, the solution cooled, and 10 parts by weight of a mixture of equal parts of concentrated sulphuric acid-glacial acetic acid were added, and the mixture heated for 5 hours on a steam bath, then washed repeatedly with salt water, a little ether added to prevent emulsification, the ether removed by placing the mixture on a steam bath, forming a dark condensate, which was distilled off up to 200–210° C., leaving a golden brown, almost odorless residue. Two parts by weight of this residue, dissolved in two parts by weight of carbon tetrachloride, were treated with 0.7 part by weight of chlorosulphonic acid, added drop by drop with stirring. The mixture heats and evolves hydrogen chloride. This product was neutralized by an excess of caustic soda, separating a clear amber layer containing the sodium salt of the dipentene-phenol sulphonate, which may be diluted with water to form a clear solution, which foams readily and forms extremely stable emulsions.

Example III

To 50 parts by weight of phenol dissolved in 100 parts by weight of dipentene and 50 parts by weight of alcohol, were added 10 parts by weight of concentrated hydrochloric acid, the mixture heated slowly to 80° C. and maintained at that temperature for 4 hours, then heated slowly to the boiling point and refluxed for 4 hours. After cooling and washing with water at room temperature, the excess terpene was removed by steam distillation. The resulting product was sulphonated by treating 100 parts by weight thereof with 100 parts by weight of concentrated sulphuric acid at 30–35° C. and maintaining the mixture at such temperature for one-half an hour. The product of this sulphonation may be obtained as the sodium salt by neutralizing with 20% caustic soda solution, allowing to stand, removing the water layer which separates, and recovering the sodium salt in paste form, which may be dried and powdered, if desired.

*Example IV*

To a solution of 100 parts by weight of resorcinol in 200 parts by weight of pinene were added 1.5 parts by weight of p-toluene-sulphonic acid, the mixture allowed to stand overnight, then heated to 100° C. for 2 hours, then refluxed for 4 hours. After washing with warm water, the excess terpene was removed by steam distillation, the condensation product separated from the water layer, and dried. To 10 parts by weight of such condensation product, dissolved in 10 parts by weight of carbon tetrachloride, were added 5 parts by weight of chlorosulphonic acid at 20–25° C., the mixture maintained at this temperature for about one-half an hour, then neutralized with 20% caustic soda solution to form the sodium salt of the sulphonated condensation product.

*Example V*

To a solution of 50 parts by weight of a commercial mixture of para-, meta- and ortho-cresol in 100 parts by weight of turpentine was added 1 part by weight of p-toluene-sulphonic acid, the mixture allowed to stand overnight, then heated very slowly to 100° C. and maintained at such temperature for 1 hour, then the temperature gradually raised to the boiling point and refluxed for 4 hours. After cooling, washing with water the excess terpene was removed by steam distillation, the condensation product separated from the water, and dried. To 61 parts by weight of the above condensation product, dissolved in an equal weight of carbon tetrachloride, were added 32 parts by weight of chlorosulphonic acid at 20–25° C., the mixture maintained at such temperature for one-half an hour, then neutralized with 20% caustic soda solution to form the sodium salt of the sulphonation product.

*Example VI*

To a solution of 50 parts by weight of commercial xylenol in 100 parts by weight of dipentene was added 1 part by weight of p-toluenesulphonic acid, the mixture allowed to stand overnight, then heated to 100° C. for 2 hours, then to its boiling point and refluxed for 4 hours, cooled, washed with water, and steam distilled to remove the excess terpene, the water separated, and the condensation product dried. Of such dry condensation product, 129 parts by weight were dissolved in an equal weight of carbon tetrachloride and sulphonated by adding 64 parts by weight of chlorosulphonic acid at 20–25° C. and maintained such temperature for one-half an hour, then neutralizing by addition of 20% caustic soda solution, to produce the sodium salt of the sulphonation product.

*Example VII*

To a solution of 100 parts by weight of naphthalene in 200 parts by weight of dipentene were added 10 parts by weight of p-toluene sulphonic acid. The mixture was slowly heated to the boiling point and refluxed for eight hours. After cooling and washing with warm water, the excess terpene was removed by steam distillation, the product was separated from the water, and was dried. Of the dry condensation product, 2 parts by weight, dissolved in an equal weight of trichlorethylene, were sulphonated by 1 part by weight of chlorosulphonic acid at 35–40° C. and maintaining that temperature for one hour. The sulphonation product was neutralized by the addition of 20% caustic soda solution.

*Example VIII*

To a solution of 150 parts by weight of o-cresol in 200 parts by weight of pinene were added 0.3 part by weight of p-toluene sulphonic acid and the mixture allowed to stand overnight under a blanket of carbon-dioxide. This mixture was then heated under carbon dioxide, at 100° C. for one hour, the temperature raised to 130° C. for two hours and finally heated two hours at 160–170° C. The resulting mixture was then water-washed and steam distilled whereby water-soluble portions and volatile oils were removed, leaving a 217 parts by weight of a condensation product of pinene and o-cresol of a light yellow color. One hundred parts by weight of this condensation product was dissolved in 300 parts by weight of carbon tetrachloride. This solution was cooled to 20° C. Fifty-two parts by weight of chlorosulphonic acid was then slowly added to this solution with cooling and stirring such that the temperature stayed at 20–25° C. This treatment required about thirty minutes. The mixture was then stirred for an additional three minutes, neutralized by the addition of 231 parts by weight of a 10% solution of sodium hydroxide and rendered slightly alkaline by the addition of 3 parts by weight of sodium carbonate, to form the sodium salt of the sulphonation product of the pinene-o-cresol condensation product. This product was recovered as tan, friable material in a yield of 147 parts by weight by distilling water and solvent out of the reaction mixture until the residue was a paste and then drying this paste in a vacuum oven at 60–65° C.

*Example IX*

The condensation product of pinene and m-cresol was produced by following the condensation procedure described in Example VIII, with the substitution of 150 parts by weight of m-cresol for the o-cresol. As a result of this procedure 303 parts by weight of a pale yellow product was obtained. This produce was then sulphonated by treatment with chlorosulphonic acid following the sulphonation procedure described in Example VIII, except in that 220 parts by weight of a 10% aqueous sodium hydroxide solution and 6 parts by weight of sodium carbonate were used. As a result of this procedure 157 parts by weight of the sodium salt of the sulphonation product of the condensation product of pinene and m-cresol was obtained. This product was lavender in color.

Example X

The condensation product of pinene and p-cresol was produced by following the condensation procedure described in Example VIII, with the substitution of 150 parts by weight of p-cresol for the o-cresol. As a result of this procedure 267 parts by weight of a pale yellow condensation product was obtained. This product was then sulphonated with chlorosulphonic acid following the sulphonation procedure of Example VIII, except in that 5 parts by weight of sodium carbonate was used. As a result of this procedure 150 parts by weight of the sodium salt of the sulphonation product of the condensation product of pinene and p-cresol was obtained. This product was greyish white in color.

Example XI

The condensation product of terpinene and phenol was produced by following the condensation procedure described in Example VIII, with the substitution of 200 parts by weight of terpinene and 150 parts by weight of phenol for the pinene and o-cresol, respectively. As a result of this procedure 126 parts by weight of a water-white condensation product of terpinene and phenol were produced. This product was then sulphonated by the sulphonation procedure of Example VII, except in that 242 parts by weight of a 10% aqueous sodium hydroxide solution and 1 part by weight of sodium carbonate were used. As a result of this procedure, 139 parts by weight of the sodium salt of the sulphonation product of terpinene-phenol condensate were obtained. This product was tan in color.

The above products, obtained in accordance with this invention, in the form of the free sulphonation product or the alkali salt thereof, are clearly soluble in water and form remarkably effective wetting, emulsifying and dispersing agents. They may be employed wherever a wetting, cleansing or emulsifying action is desired, e. g., in the treatment of textile fibers and the like. They are particularly useful in acid solutions, e. g., in acid dye baths, in the emulsification of petroleum oils, fatty oils, and the like.

This application is a continuation-in-part of my application, Serial No. 142,480, filed May 13, 1937.

What I claim and desire to protect by Letters Patent is:

1. The process of preparing sulphonic acids of high cleansing, wetting and emulsifying power, which consists in condensing an unpolymerized terpene with a member of the group consisting of non-halogenated members of the benzene and naphthalene series and their hydroxy compounds, and sulphonating the product.
2. The condensation product obtained by the process of claim 1.
3. The process of preparing sulphonic acids of high cleansing, wetting and emulsifying power, which consists in condensing pinene with phenol and sulphonating the product.
4. The condensation product obtained by the process of claim 3.
5. The process of preparing sulphonic acids of high cleansing, wetting and emulsifying power, which consists in condensing dipentene with phenol and sulphonating the product.
6. The condensation product obtained by the process of claim 5.
7. The process of preparing sulphonic acids of high cleansing, wetting and emulsifying power, which consists in condensing turpentine with phenol and sulphonating the product.
8. The condensation product obtained by the process of claim 7.
9. The process of preparing sulphonic acids of high cleansing, wetting and emulsifying power, which consists in condensing an unpolymerized terpene with a cresol and sulphonating the product.
10. The condensation product obtained by the process of claim 9.
11. The process of preparing sulphonic acids of high cleansing, wetting and emulsifying power which consists in condensing an unpolymerized terpene with m-cresol and sulphonating the product.
12. The condensation product obtained by the process of claim 11.

ARTHUR L. OSTERHOF.